United States Patent [19]
Connell

[11] Patent Number: 5,130,593
[45] Date of Patent: Jul. 14, 1992

[54] INDUCTOR ALTERNATORS

[76] Inventor: James J. Connell, 5140 S. Hyde Park, Apt. 15-J, Chicago, Ill. 60615

[21] Appl. No.: 588,282

[22] Filed: Sep. 26, 1990

[51] Int. Cl.⁵ .............................................. H02K 1/12
[52] U.S. Cl. ....................................... 310/256; 322/46
[58] Field of Search ............... 310/256, 261, 263, 269, 310/254, 179, 180, 153, 265, 268, 184, 198, 168; 318/138; 322/47, 46, 51

[56] References Cited

U.S. PATENT DOCUMENTS

| | | | |
|---|---|---|---|
| 3,036,248 | 5/1962 | Nellist | 317/166 |
| 3,634,743 | 1/1972 | Ingenite | 318/138 |
| 3,912,958 | 10/1975 | Steen | 310/168 |
| 4,222,263 | 9/1980 | Armstrong | 73/116 |
| 4,588,914 | 5/1986 | Heyne | 310/156 |
| 4,885,526 | 12/1989 | Szabo | 322/46 |
| 4,941,553 | 7/1990 | Harrison | 188/156 |
| 4,973,870 | 11/1990 | Vehara | 310/78 |

OTHER PUBLICATIONS

M. G. Say, Alternating Current Machines, 1976, pp. 484-487.
Leander W. Matsch, Electromagnetic and Electromechanical Machines Second Edition, 1977, pp. 485-491.
A. Draper, Electrical Machines, 1967, pp. 205-208.
Charles Proteus Steinmetz, Theory and Calculations of Electrical Apparatus, 1917, pp. 274-287.

*Primary Examiner*—Steven L. Stephan
*Assistant Examiner*—E. H. To
*Attorney, Agent, or Firm*—Norman L. Wilson, Jr.

[57] ABSTRACT

Traditional alternators, that is those non-inductor alternators employed in machines such as automobiles, provide either moving conductors which cut through a stationary magnetic field, or a moving magnetic field which passes over stationary conductors. In conventional inductor alternators, neither the field nor armature rotate. An electromotive force is induced in the output windings by periodic changes in the local reluctance of the magnetic circuit carrying the magnetic flux. The reluctance is governed by the shape of the rotor relative to the stator. By the elimination of the stator housing and of the rotor encompassing stator, this invention provides for the use, as inductor alternator rotors, of components which previously could not function as rotors.

14 Claims, 3 Drawing Sheets

INDUCTOR ALTERNATORS

BACKGROUND OF THE INVENTION

This invention, broadly, relates to alternators. In a more specific aspect, the invention pertains to inductor alternators.

Traditional alternators, that is, those non-inductor alternators employed in machines such as automobiles, provide either moving conductors which cut through a stationary magnetic field (rotating armature alternators), or a moving magnetic field, which passes over stationary conductors (rotating field alternators). In either case an induced electromotive force (emf) is produced in the conductors or in armature windings. Hence, traditional alternators include a field, an armature or output winding, and motion between the two.

In a rotating armature alternator an essentially stationary magnetic field is provided, usually by current in field coils. The armature, acting as a rotor, revolves in this field, cutting lines of magnetic flux, thus inducing in the armature windings an emf capable of driving a current. In a rotating field alternator, the arrangement is reversed. The armature coils are fixed on the stator, and the field is produced in the rotor. As the rotor rotates, the flux through the armature windings changes, and an emf is induced on the essentially fixed armature windings. Generally speaking, traditional alternators require electrical connections between the moving rotor and the fixed structure of the alternator. In the case of rotating field alternators, this connection is needed to supply the field coils with current to produce the magnetic field; in the case of rotating armature alternators, it is required to carry the output current. The usual means of achieving an electrical connection with the rotor in an alternator is to mount brushes on the fixed structure of the alternator and hold them in contact with sliprings on the rotor. Brushes and sliprings have a number of disadvantages: they are subject to constant wear, increasing the maintenance requirements of alternators; the wear and friction make them a frequent point of failure in alternators; they are often a limiting factor in the rotational speed of alternators.

In conventional inductor alternators, neither the field nor the output windings rotate: both the field coils (or permanent magnetic material) and the output windings are mounted on the stator. An emf is induced in the output windings by periodic changes in the magnetic flux through the windings caused by corresponding changes in the reluctance of the magnetic subcircuit carrying the magnetic flux through the windings. The reluctance is governed by the shape of the rotor relative to the stator. As the rotor moves it creates, due to this shape, changes or pulsations in the reluctance of local sub-circuits of the overall magnetic circuit carrying the flux. The rotor serves only as a component of the magnetic circuit or flux path of the alternator and so carries no coils or windings. Hence, there is no need for electrical connections with the rotor, and such devices as brushes and sliprings are eliminated.

Broadly, inductor alternators can be placed in two categories. If the direction of the magnetic flux through each section of the rotor remains the same as the rotor spins, the machine is termed a homopolar inductor alternator. If the direction of flux changes in sections of the rotor as it rotates, the machine is a heteropolar inductor alternator. The patent art, insofar as I have been able to determine is exemplified by timing devices such as U.S. Pat. No. 3,634,743, and relays such as U.S. Pat. No. 3,036,248. In the absence of analogous or pertinent patent art, I refer to such textbooks as *Alternating Current Machines* 3 by M. G. Say (1976), *Electromagnetic Electromechanical Machines* by Leander W. Matsch (1977), and *Electrical Machines* by A. Draper (1967). As is explained in such texts, the field coils producing magnetic flux in the alternator are disposed in the stator adjacent to the stator cores. The alternating current output windings are mounted on the stator cores near the air gaps which are between them and the rotor. As in any alternator, the path of least reluctance for the magnetic flux is through the rotor. The reluctance of the flux path, or magnetic circuit, bears a first order relation to the size of the air gaps between the stator and the rotor (provided, of course, that the magnetic flux density is not limited by magnetic saturation in some other part of the magnetic circuit). Usually, the surface of the rotor adjacent to the stator is provided with teeth, with gaps between them. (If desired, the gaps can be filled by a material with poor magnetic properties to provide a smooth surface on the rotor and reduce air friction or to increase the rotor's structural strength.) The path of least reluctance between the stator and the rotor, where most of the flux passes, is through the short air gaps between the stator and the rotor teeth. Much less flux passes through the larger air gaps in the slots between the rotor teeth where the reluctance is much greater. As the rotor rotates, its slots and teeth alternately come into positions opposite different sections of the stator cores, causing the magnetic flux through those sections to undergo periodic variations, thus indicating an emf in the output winding mounted there.

In some inductor alternators the stator, as well as the rotor, is provided with gaps and teeth. In these machines most of the flux passes through the stator and rotor teeth which are aligned with each other. Such toothed stator machines are used to produce high frequency output without necessitating closely spaced output windings. The pitch of the output winding mounted on the stator cores of other inductor alternators is matched with the rotor teeth.

Inductor alternators have been used to generate high frequency power where the structural limitations, or the rotational speed limits (often resulting from brushes and sliprings) render traditional alternators impractical. Inductor alternators are also used with drivers having very high shaft speeds (such as gas turbines) where traditional non-inductor alternators would require heavy and expensive reduction gearing. Traditional non-inductor alternators have usually been preferred over inductor alternators for low and moderate speed applications despite the disadvantage of brushes and sliprings. Unlike traditional non-inductor alternators, the flux through the output windings in an inductor alternator does not change direction but rather goes from some minimum to a maximum of the same polarity. Thus, all things being equal, an inductor alternator has roughly half the output emf of a similarly sized traditional alternator operating at the same shaft speed.

This invention provides a variety of inductor alternators that can replace non-inductor alternators in low and moderate speed applications. Conventional ways of replacing a non-inductor alternator in such low and moderate speed applications include increasing the size of the inductor alternator, or increasing its shaft speed to roughly twice that of a comparable non-inductor alternator. The former solution has the disadvantage of increased size and cost while the latter solution usually introduced difficulties with bearings and step-up gearing. This invention overcomes both of these disadvantages.

SUMMARY OF THE INVENTION

A type of inductor alternator includes a rotor encompassing stator, and a rotor adapted to rotate within the stator. Windings are adapted to produce a magnetic flux in a magnetic circuit through the stator across to and through the rotor and back to the stator. Spaced inductor teeth on he rotor periphery are so disposed that the path of least reluctance for the magnetic flux is through the teeth. Output windings within the stator carry output induced therein as the flux density through the windings changes from a maximum to a minimum as flux sub-circuits through the windings alternately include and do not include rotor teeth. An electromotive force is induced as a result of this variation in the flux. That inductor alternator is improved herein by the provision of a stator which does not envelop the rotor. The improvement includes the combination of a rotor, with a stator segment adapted to form a magnetic flux circuit through a sector of the rotor, and means coupling the stator segment with a rotor sector so that the rotor teeth are the path of least reluctance for magnetic flux, inducing an electromotive force as the rotor rotates. Such an inductor alternator has a wide variety of uses not available to conventional alternators.

DETAILED DESCRIPTION OF THE INVENTION

In traditional rotating field or rotating armature alternators, the magnetic flux density through an armature typically varies from a maximum value, B, to a minimum value of equal magnitude but opposite polarity, −B. This results in a total peak-to-peak amplitude of 2B in the flux density cycles. In a conventional inductor alternator the magnetic flux density through a section of armature winding varies from a maximum, B, to a minimum, b, of the same polarity, giving an amplitude of B−b. The minimum flux density, b, is typically very close to zero giving a peak-to-peak amplitude for the flux density cycles of approximately B. Since the magnitude of B is usually determined by the magnetic saturation properties of the materials used in the magnetic circuits, the amplitude of the flux density cycles in an inductor alternator is typically half that of a comparable traditional alternator. This means that the inductor alternator typically has an output half that of the traditional alternator. Nevertheless, inductor alternators are especially suited to high speed applications where traditional alternators are severely limited by their brushes and sliprings. Inductor alternators are also employed in high frequency applications where the increased number of pole pairs and windings required in a traditional alternator become prohibitive. The alternators provided herein fulfill not only those needs, but many others where previous inductor alternators could not be used.

DESCRIPTION OF THE DRAWINGS

The invention thus far generally explained will now be described in detail by referring to the figures in the accompanying drawings and to preferred embodiments of the invention.

FIG. 6 and 9 show specific embodiments of the inductor alternators of the invention.

As indicated hereinbefore, conventional inductor alternators consist of a rotor encompassing stator. To my knowledge, the rotor is generally encased within the stator. The invention herein relates to an inductor alternator wherein the rotor is not encompassed by the stator, permitting the economical use of rotors of comparatively large radius and correspondingly high peripheral speeds for a given rotational speed. The invention encompasses the combination of (1) rotor, with (2) a stator adapted to be coupled with only a portion of the rotor's circumference. Thus, in its preferred embodiment, the simplest part of an inductor alternator, the rotor, can be enlarged to increase the output at low rotational speeds while the heaviest, most complex and expensive part, the stator, is kept small. In effect, the large radius rotor "steps up" an otherwise normal size inductor alternator without the use of gears, belts and pulleys or other mechanical devices. Finally, this type of inductor alternator provides a level of design flexibility that facilitates incorporating the rotor into, or onto, other rotating machine elements, such as engine flywheels.

Figure 1:
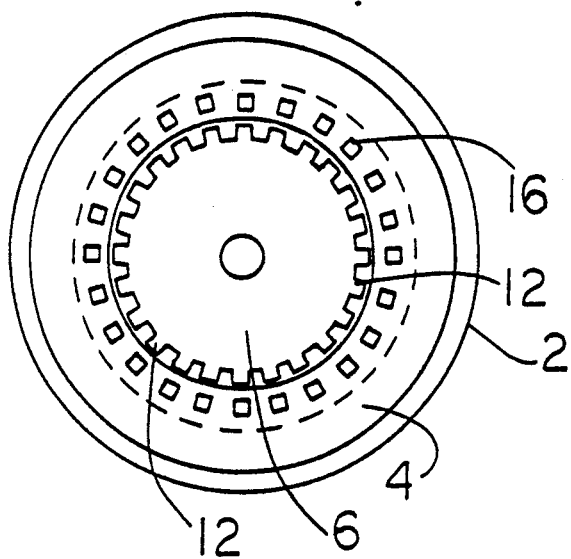
FIG. 1 is a diagrammatic view of a conventional homopolar inductor alternator.
Figure 3:
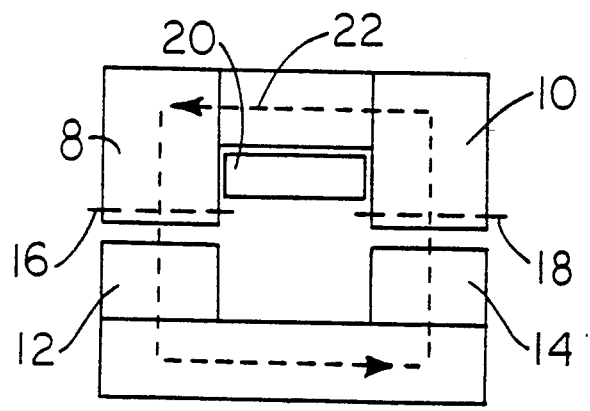
FIG. 3 is a partial cross sectional view of the homopolar inductor alternator shown in FIG. 1.

FIG. 1 shows a conventional homopolar inductor alternator 2 provided with a stator 4 and rotor 6. It will be appreciated that the stator 4 encompasses the entire rotor 6. Inductor alternator 2 is fabricated with two laminated stator cores 8 and 10 shown in FIG. 3. In addition, two sets of inductor rotor teeth 12 and 14 (with only 12 visible in FIG. 1) are provided. Stator cores 8 and 10 (FIG. 3) carry output windings 16 and 18. The field winding 20 consists of a coil concentric with the machine's axis to produce a unidirectional flux path 22 through body stator 4 and rotor 6, linking output windings 16 and 18. Most of the magnetic flux produced by field winding 20 passes through rotor 6 via teeth 12 and 14, as shown in FIG. 3. The pitch of output windings 16 and 18 is such that as the rotor 6 revolves the flux through them via the teeth 12 and 14 is becomes cyclical. The total flux through rotor and stator 4 remains approximately constant as the rotor revolves, minimizing any reaction in field coil 20.

Figure 2:
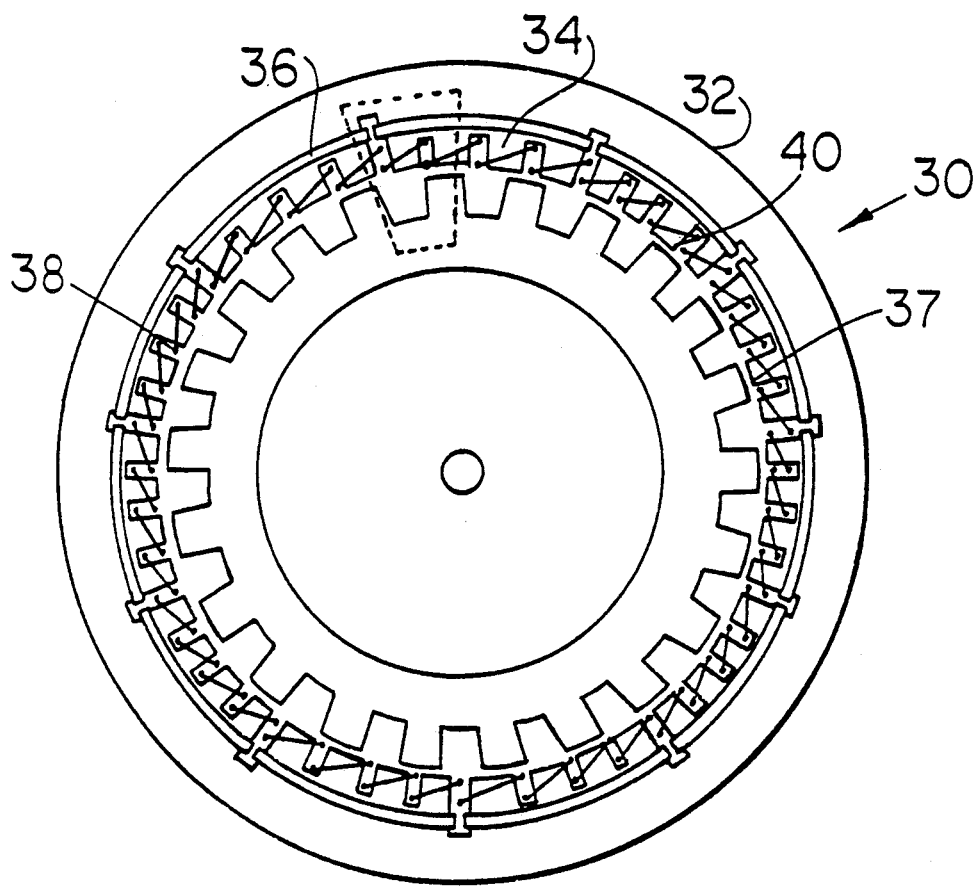
FIG. 2 is a diagrammatic view of a conventional heteropolar inductor alternator.

A conventional heteropolar inductor alternator 30 is shown in FIG. 2. This inductor alternator is also provided with a housing 32, a stator 34, field windings 36, and output windings 38. In contrast to field windings 20 in a homopolar machine, such as alternator 2, the field winding in 30 are split into coils 36 in special stator slots. The field coils are not concentric with the alternator shaft and the polarity of the reflux through the inductor teeth 37 varies as the rotor revolves. As in a homopolar inductor alternator, the magnetic flux through any point on the surface of the stator core adjacent to the rotor depends upon the local reluctance of the magnetic circuit which bears a first order relation to the size of the air gap between the stator and rotor at that point. Thus the flux through each point varies from a maximum when it is opposite a tooth to a minimum when it is opposite an air gap 40. The local flux goes through one complete cycle each time the rotor moves through one rotor tooth pitch. As the rotor revolves the local flux in each magnetic subcircuit through the windings becomes cyclical cycles and a corresponding cyclic emf is induced in the output windings 38, which are placed as close as is convenient to the surface of the stator adjacent to the rotor where the local flux varies the most.

The output emf of an alternator is directly related to the peripheral speed of its rotor. Increasing this speed will, to first order, proportionately increase the alternator's output emf. As stated hereinbefore, an inductor alternator produces about half the output of a comparably sized traditional alternator. If, for example, a traditional rotating field alternator were replaced with a conventional inductor alternator of similar size, the inductor alternator would have to operate at approximately twice the shaft speed to produce the same output. Such an approach entails many disadvantages, such as more elaborate or expensive bearings and extra gearing. In many applications, these disadvantages outweigh the inherent advantages of an inductor alternator. A larger inductor alternator could be employed operating at the same rotational speed as the rotating field machine, but only at a considerable penalty in weight and cost.

By the practice of this invention, the rotor of an inductor alternator, rather than the entire alternator, can be enlarged. The simplest part of an inductor alternator is the rotor. By this invention, the rotor of the inductor alternator can be doubled in size, with the size of the stator constant. The shape of the stator is modified, engaging only a portion or sector of the periphery of the rotor. The inductor alternator thus becomes a segmental stator inductor alternator wherein the rotor is no longer fully encompassed by the stator. Due to its increased peripheral speed, such a machine has an output comparable to the rotating field alternator at the same shaft speed and with only a relatively slight penalty in weight. Carrying the teachings of the invention further, the rotor can be made still larger and the stator segment reduced in size until an optimum design is achieved for a given application. This invention thus offers a new degree of freedom in the design of alternators.

Figure 4:
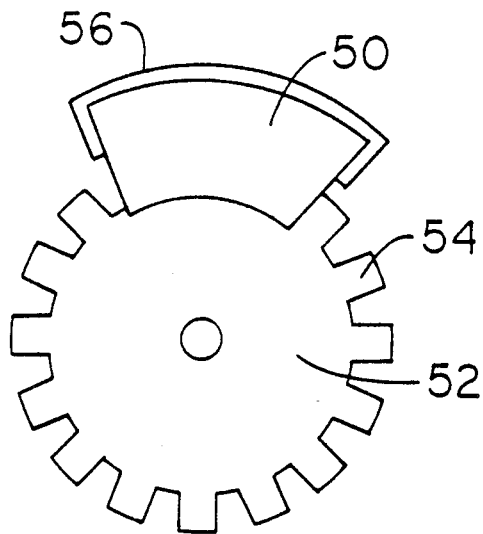
FIG. 4 is a representation of a preferred form of homopolar inductor alternator of this invention.
Figure 5:
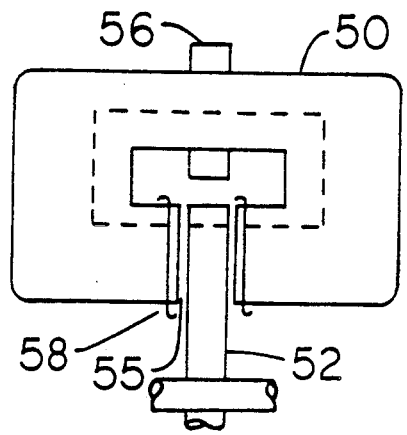
FIG. 5 is a partial cross sectional view of the inductor alternator shown in FIG. 4.

A preferred inductor alternator of this invention, with a stator segment that is coupled with only a sector of the rotor, is shown in FIG. 4. The rotor 52 is provided with teeth 54 and gaps as in other inductor alternators. But it can be seen that stator 50 does not encompass the rotor 52. A field winding 56 is mounted on stator 50 as shown. In this preferred embodiment, as shown in FIG. 5, a flat rotor 52 passes through the opening or gap 55 in stator 50 of C-shaped cross-section. While a rotor such as 6 in FIG. 1 can be used in an alternator of this invention, this flat design is less complex and costly for a given size rotor. The field coil 56, visible in FIG. 5, encircles the stator opposite the gap 55. The flux path is then around the stator as shown with most of the flux crossing gap 55 through rotor teeth 54 which is the path of least reluctance. Very little magnetic flux crosses the larger air-gaps between the teeth. As in other inductor alternators, when the rotor revolves, the local magnetic flux density in the stator near the gap changes and an emf is induced in the output windings. The output windings 58 are positioned near one or both faces of stator 50 near gap 55 where the flux density changes are greatest. The stator 50 is adapted to minimize reaction in the field coil by maintaining approximately the same total reluctance in the overall magnetic circuit when the device operators. Basically this requires that it overlap an equal number of teeth and gaps between teeth at all times, though the effects of magnetic fringing can also be taken into account in the design.

Figure 6:
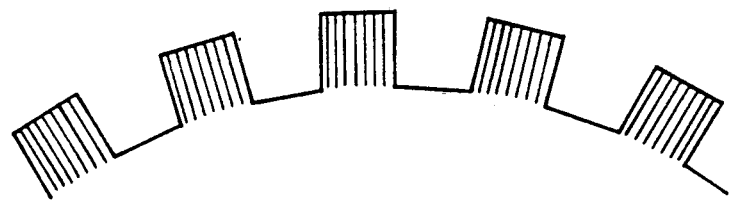
FIG. 6 shows a form of inductor alternator rotor with a tooth type that reduces eddy currents.

Because, when the rotor turns, teeth on the rotor move into and out of the stator gap 55 and hence into and out of the magnetic field, eddy currents tend to be generated in the rotor teeth. The losses due to eddy currents can be reduced by employing core materials or laminated materials for the rotor teeth as is known in the art. An alternate method, which may be preferable in some applications, is to cut or otherwise form narrow radial slits in the teeth, as shown in FIG. 6. The problem of eddy currents must also be considered in the stator construction which should be of magnetic core material. An exception to this is the part of the stator proximate to or encircled by the field coil. This portion can be made of a solid conducting material, if so desired. Any currents induced therein would tend mainly to dampen the reaction in the field coil. Special damping coils can be employed in the same way if desired.

Figure 7:
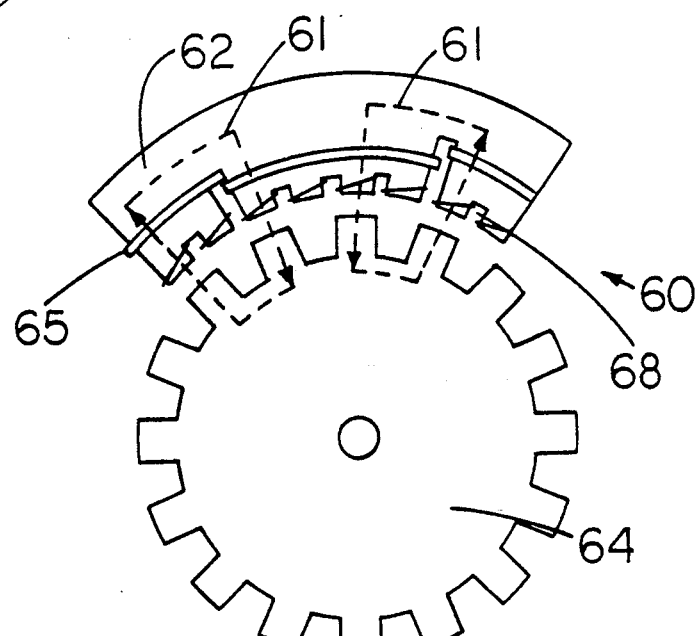
FIG. 7 is a partial diagrammatic view of a heteropolar inductor alternator of this invention.

The alternator shown in FIG. 4 is a homopolar inductor alternator in design since the direction of flux in the rotor teeth does not change while they are engaged by the stator. A heteropolar inductor alternator 60, FIG. 7, with its stator segment 62, rotor 64, multipolar flux paths 61, field coil 65 and output windings 68 is also within the contemplation of this invention.

As indicated herein, the size of the stator segment is sufficient, given the peripheral speed, to produce the desired induced electromotive force. While this emf determination is known in the art, a specific example will now be given.

Consider a segmental stator inductor alternator such as that shown in FIG. 4 with a rotor diameter of 30.5 cm (about that of a typical automobile flywheel), giving a circumference of 96 cm. This rotor is provided with teeth approximately 2 cm×2 cm in area with similarly sized slots between them for a total of 24 teeth and 24 slots. The exact shape and relative areas of the the teeth and slots will vary with different alternator designs. They can, for instance, be shaped to provide a desired output waveform under a particular set of load conditions. For the purposes of this calculation, it will be assumed that all waveforms can be approximated by a simple sine wave. The general formula for the open circuit emf, V, induced around a fixed circuit is $$V = -\frac{d\Phi}{dt} \qquad (1)$$

where $\Phi$ is the magnetic flux linking the electrical circuit. Assuming the flux can be approximated by a sine wave, and the output circuit consists of N turns around the magnetic flux path, $$\Phi = N \Phi_O \sin(2\pi ft + \phi) \qquad (2)$$

where $\Phi_O$ is the amplitude of the magnetic flux through the flux path, f is the frequency, and $\phi$ is an arbitrary phase constant. If $B_o$ is the effective amplitude of the magnetic flux density, $$\Phi_O = B_O A \quad (3)$$

where A is the cross sectional area of the magnetic flux path. This gives a voltage amplitude of $$V_O = 2\pi N f B_O A \quad (4)$$

or a root-mean-squared amplitude of $$V_{rms} = \sqrt{2}\, \pi N f B_o A \quad (5)$$

In an inductor alternator the flux varies from a maximum, B, to a minimum, b, and the effective flux density amplitude is $$B_o = \frac{B - b}{2} \quad (6)$$

where b is typically small. Most materials used in alternators saturate at a magnetic flux density significantly above 1 telsa. Hence conservative estimate of the amplitude of the flux density variations would be 0.5 Tesla. Using equation (3), if the stator overlaps three pairs of teeth and slots, the full active area of the alternator would be 24 cm² (0.0024 m²), giving a total flux amplitude through the magnetic circuit of $\Phi_o = 0.0012$ Webbers. For a shaft speed of 500 rpm, a frequency of f=200 Hz is produced. By equation (5) an output winding of N=15 turns then gives a root-mean-squared open circuit voltage of $V_{rms}=16.0$ Volts. The above calculation can be generalized to an arbitrary periodic waveform by means of Fourier analyses, as is well known in the art.

It has been emphasized that a preferred aspect of this invention involves incorporating the inductor alternator's rotor into an existing rotating component of a machine. The use of a stator segment often makes this feasible. The overall size of the resulting alternator is not determined solely by the size of the rotating element so used. Furthermore, a segmental stator does not limit access, as for maintenance or repairs, in the way a full stator would.

Figure 9:
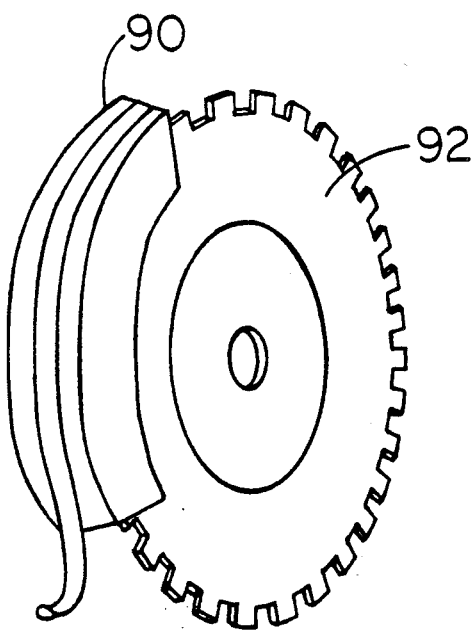

Integrating the rotor of an inductor alternator with a rotating element in its driving machine offers significant advantages in many applications. A good example of this is the flywheel on an internal combustion engine modified to serve as the rotor for a segmental stator inductor alternator of this invention. Most such engines require an alternator or generator for auxiliary electrical production. This electrical power is most often provided by a rotating field or armature machine of conventional design mounted on the engine block and driven via a belt and pulleys. FIG. 9 shows an embodiment of this invention which provides an alternative approach. The teeth required for an inductor alternator are incorporated in the periphery of the flywheel. Encasing the entire flywheel with a stator would be prohibitive, would limit access to the flywheel, and would provide an alternator with a potential output excessive for most needs. Using this invention, a stator segment 90 can be employed. In this way the size of the stator can be adapted to the required electrical output, engine rotational speed, and the size of the flywheel needed for the engine. Access to the flywheel is only minimally restricted, and the stator can e disposed on the flywheel housing at the most convenient point, for example, so as not to interfere with a starter motor. This design reduces the overall size of the engine by eliminating the bulky appendage of a separate alternator. It also enhances reliability by eliminating the belt, pulleys, separate alternator bearings, and brushes and sliprings.

The segmental stator inductor alternator of this invention, with its stator engaging only a sector of the rotor, can replace traditional alternators in many low speed applications. The most significant advantage of the inductor alternator is the elimination of brushes and sliprings. These parts are subject to wear and corrosion, and often require periodic replacement. They are also a prime source of breakdowns and failures in alternators. They are subject to sparking which can, in potentially explosive environments, pose a safety hazard. They also produce ozone which can be an environmental hazard. All of these problems are eliminated by the use of the inductor alternator provided herein. Finally, by incorporating its rotor into the structure of various rotating parts of a driving machine, the use of a segmental stator inductor alternator can eliminate the need for separate alternator bearings and various drive means such as gears or belts and pulleys, enhancing the reliability of the alternator system, and reducing maintenance needs. This can also result in a more compact and lighter overall machine, and can reduce production costs.

Figure 8:
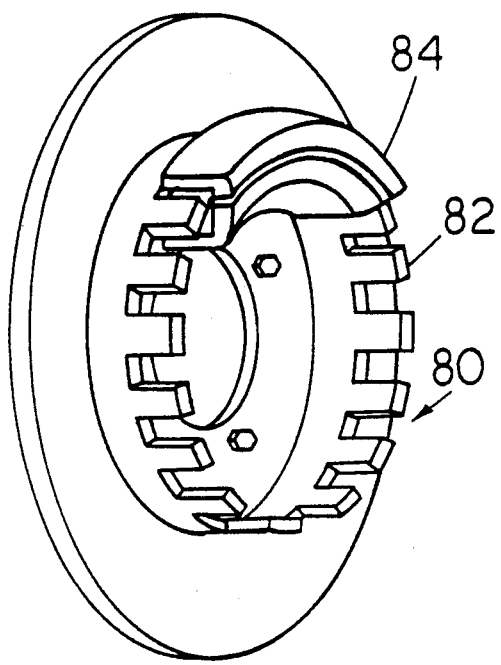

Summarizing, as indicated hereinbefore, inductor alternators conventionally consist of a rotor encompassing stator. This is not the case here. This type of inductor alternator provides a level of design flexibility that facilitates incorporating the rotor into, or onto, other rotating machine elements, such as flywheels, gear wheels, drive wheel, turbine rotors or brake disks. Given the practice of this invention, numerous variations will come to mind. It is possible to provide a multiphase output from a segmental stator inductor alternator. This can be accomplished, as is the usual practice with conventional alternators, by mounting multiple sets of windings on the stator which are offset from each other. It may also be accomplished by the use, for each phase, of a separate stator with a single winding. The mounting of these stators may then be physically offset around the rotor to produce the desired phases. In another embodiment of this invention, FIG. 8, a rotor 80 may be used with its teeth 82 mounted perpendicular to the rotating part. Such a design when incorporated into a machine part, leaves the outer edge of the part free for other uses. It will also be realized that much of the rotor, including the center, is not used as a part of the magnetic circuit and so need not have any particular magnetic properties. It could be made of plastic, for example. Thus, the range of machine parts that could incorporate a rotor is not limited to those made of magnetic materials. The alternator may also be used as a speed sensor. The number of cycles per unit time may be counted to determine the rotational speed. Alternatively, since the output emf with a fixed field strength is proportional to the rotation speed, the rotation speed may be determined by measuring the emf. For these applications the stator can be reduced to a very small size that engages only one tooth and one gap of the rotor. As with most rotational electrical machines, this type of inductor alternator can also be built as a linear machine. These and other advantages and modifications will occur to those skilled in the art and hence such ramifications are deemed to be within the scope of this invention.

What is claimed is:

1. An inductor alternator for generating power where the environment militates against existing alternators having rotors encased within their stators comprising (a) a rotor of large radius relative to corresponding existing encased rotors but having a correspondingly higher peripheral speed for a given rotational speed, the rotor having a plurality of spaced rotor teeth which on rotor rotation inscribe a circle or annulus, (b) a stator facing only a sector of the rotor rather than enclosing said rotor, the stator being in the form of a segment disposed adjacent the rotor, engaging at any one time only an arc of said inscribed circle or annulus, (c) stationary field coils so disposed within the stator to produce a magnetic flux forming a magnetic circuit through said stator segment and rotor, with the main flux path passing through the rotor teeth in said arc of the inscribed circle or annulus, and (d) output windings disposed within the stator near a stator face where flux density changes are greatest, the output windings being adapted to carry out current induced therein by flux variations resulting from movement of the rotor teeth through the stator.

2. The inductor alternator of claim 1 wherein an additional stator engages an arc of said inscribed circle.

3. The inductor alternator of claim 1 wherein the field coils are adapted to produce a homopolar magnetic circuit.

4. The inductor alternator of claim 1 wherein the field coils are adapted to produce a heteropolar magnetic circuit.

5. The inductor alternator of claim 1 wherein the rotor is also in a machine component.

6. The inductor alternator of claim 1 wherein the rotor disc, other than the toothed periphery, is a nonmagnetic material, and the toothed periphery is a magnetic material.

7. The inductor alternator of claim 1 wherein the size of the stator segment is correlated with the rotor peripheral speed, flux path reluctance, field winding turns and current to engage a number of rotor teeth determined to produce a required induced electromotive force and current.

8. The inductor alternator of claim 1 wherein the machine component becoming the rotor is directly linked to a drive shaft of its driving machine, eliminating a separate alternator, alternator drive means and accompanying bearings, belts and gears.

9. The inductor alternator of claim 8 wherein the rotor is a flywheel.

10. The inductor alternator of claim 8 wherein the rotor is a gear wheel.

11. The inductor alternator of claim 8 wherein the rotor is a turbine engine rotor.

12. The inductor alternator of claim 8 wherein the rotor is a brake disk or drum.

13. The inductor alternator of claim 8 wherein the rotor is a wheel.

14. The inductor alternator of claim 8 wherein the rotor is a clutch component.

* * * * *